US012473514B2

(12) United States Patent
Sun et al.

(10) Patent No.: US 12,473,514 B2
(45) Date of Patent: Nov. 18, 2025

(54) FABRIC SOFTENING COMPOSITION COMPRISING ESTERQUAT, CATIONIC ACRYLIC POLYMER, AND GERMICIDAL CATIONIC SURFACTANT

(71) Applicant: Henkel AG & Co. KGaA, Düsseldorf (DE)

(72) Inventors: Wei Sun, Trumbull, CT (US); Melanie A. Nitz, Norwalk, CT (US); Regina Stehr, Neuss (DE)

(73) Assignee: HENKEL AG & CO. KGAA, Dusseldorf (DE)

( * ) Notice: Subject to any disclaimer, the term of this patent is extended or adjusted under 35 U.S.C. 154(b) by 727 days.

(21) Appl. No.: 17/520,230

(22) Filed: Nov. 5, 2021

(65) Prior Publication Data

US 2023/0140936 A1 May 11, 2023

(51) Int. Cl.

| | |
|---|---|
| ***C11D 1/62*** | (2006.01) |
| ***C11D 1/46*** | (2006.01) |
| ***C11D 3/00*** | (2006.01) |
| ***C11D 3/48*** | (2006.01) |
| ***C11D 17/00*** | (2006.01) |

(52) U.S. Cl.

CPC .............. *C11D 3/0015* (2013.01); *C11D 1/46* (2013.01); *C11D 1/62* (2013.01); *C11D 3/48* (2013.01); *C11D 17/0008* (2013.01); *C11D 2111/12* (2024.01)

(58) Field of Classification Search

CPC ......... C11D 1/62; C11D 1/645; C11D 3/0015; C11D 3/37; C11D 3/3927; C11D 3/48; C11D 9/30; C11D 2111/12

See application file for complete search history.

(56) References Cited

U.S. PATENT DOCUMENTS

| | | | | |
|---|---|---|---|---|
| 4,755,327 | A | 7/1988 | Bernarducci et al. | |
| 5,798,329 | A | 8/1998 | Taylor et al. | |
| 8,143,207 | B2 | 3/2012 | Mayer et al. | |
| 9,428,714 | B2 | 8/2016 | Zander | |
| 9,469,829 | B2 | 10/2016 | Panandiker et al. | |
| 10,781,402 | B2 | 9/2020 | Panandiker et al. | |
| 2008/0242584 | A1 | 10/2008 | Wahl et al. | |
| 2008/0305056 | A1* | 12/2008 | Jenni | A61Q 17/04 424/59 |
| 2010/0056647 | A1 | 3/2010 | Graham et al. | |
| 2011/0082066 | A1 | 4/2011 | Wrubbel et al. | |
| 2014/0248229 | A1* | 9/2014 | Krueger | A61K 8/8152 424/70.17 |
| 2014/0315779 | A1 | 10/2014 | Zander | |
| 2016/0287502 | A1* | 10/2016 | Goutsis | A45D 7/04 |
| 2017/0211019 | A1* | 7/2017 | Sivik | C11D 3/3749 |
| 2018/0094213 | A1* | 4/2018 | Schymitzek | C11D 3/001 |
| 2018/0371365 | A1* | 12/2018 | Perez-Prat Vinuesa | C11D 3/30 |
| 2019/0233763 | A1 | 8/2019 | Panandiker et al. | |
| 2022/0088248 | A1* | 3/2022 | Kritzler | D21H 17/11 |
| 2022/0175635 | A1* | 6/2022 | Van Gruijthuijsen | B01J 13/14 |
| 2022/0348845 | A1* | 11/2022 | Snow | C11D 3/3773 |
| 2023/0140928 | A1* | 5/2023 | Sun | C11D 3/3773 510/329 |

FOREIGN PATENT DOCUMENTS

| | | | |
|---|---|---|---|
| CH | 617456 | A5 | 5/1980 |
| GB | 1089010 | A | 11/1967 |
| GB | 2309706 | A | 8/1997 |
| WO | 9856886 | A1 | 12/1998 |
| WO | 2012114062 | A1 | 8/2012 |

OTHER PUBLICATIONS

European Search Report for Application No. 22205573.3-1109 dated Mar. 24, 2023.

BASF, Home Care Rheovis FRC and Rheovis CDE.

* cited by examiner

*Primary Examiner* — Charles I Boyer

(74) *Attorney, Agent, or Firm* — CANTOR COLBURN LLP

(57) ABSTRACT

Liquid fabric softener compositions comprising (a) water-insoluble cationic softeners, (b) water-soluble cationic anti-bacterial agents and (c) cationic rheology modifying polymers are described that are stable homogenous mixtures. A method for determining stability of the softener formulations or determining the amount of component (a), (b) or (c) involves calculating a stability index of the formulation according to the following equation: Stability formula index=[(wt % of the (a) component+3*(wt % of the (c) component)]/[wt % of the (b) component], wherein a desirable stability index value is 2.5 or greater than 2.5.

14 Claims, 1 Drawing Sheet

| Esterquat + cationic antibacterial agents + non-ionic polymer | Esterquat + cationic antibacterial agents + cationic polymer |
|---|---|
| 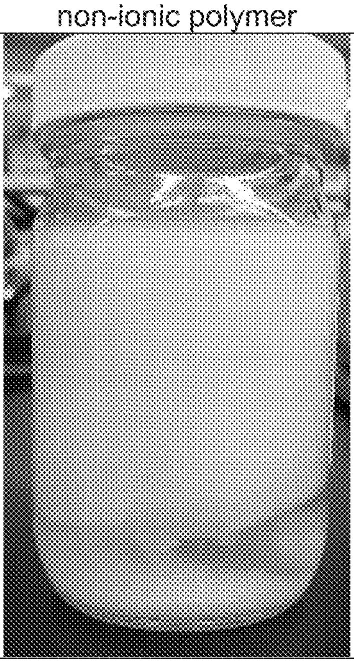 | 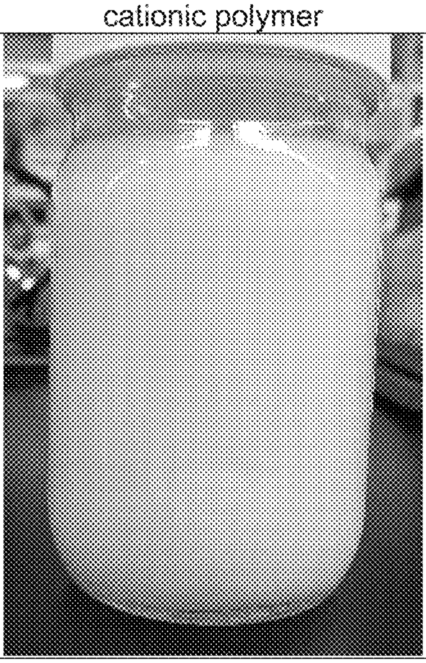 |

FABRIC SOFTENING COMPOSITION COMPRISING ESTERQUAT, CATIONIC ACRYLIC POLYMER, AND GERMICIDAL CATIONIC SURFACTANT

FIELD OF THE INVENTION

The present invention relates to fabric treatment compositions providing both fabric softening and sanitizing benefits and their methods of use for imparting softening effects and/or antimicrobial properties to a fabric. In particular, the invention relates to fabric treatment compositions that comprise a water-insoluble softening agent and a water-soluble germicidal surfactant, both of which are quaternary ammonium salts. The invention also relates to methods for preparing and determining stability of a liquid fabric softener formulation comprising water-soluble germicidal surfactant.

BACKGROUND OF THE INVENTION

Conventional rinse-added fabric softening composition uses quaternized ester-ammonium salt as cationic softening agent. The softening agent is substantially water-insoluble ester quaternary compounds that are chosen from one or a blend of diester, monoester, triester quaternary ammonium salts with fatty acids of long alkyl chains, such as diethyl ester dimethyl ammonium chloride with $C_{16-18}$ fatty acids and diethyl ester hydroxyethyl ammonium methyl sulfate with $C_{16-18}$ fatty acids.

In contrast, the quaternary ammonium salts used in fabric sanitizer or disinfectant to provide germicidal functions are mostly water-soluble cationic surfactant, such as $C_{10-18}$ Dimethyl Benzyl Ammonium Chloride (BAC), Didecyl Dimethyl Ammonium Chloride (DDAC) or quaternary ammonium surfactant with other alkyl groups using a general formula: $R^1$—$N^+(CH_3)_2$—$R^2$ wherein $R^1$ and $R^2$ are both alkyl groups containing 8 to 18 carbons.

Cationic surfactant germicides are known to have technical problems when they are used in detergent formulations containing anionic surfactants. Interaction of cationic surfactants with anionic surfactants causes instability, which could require the addition of a stabilizing agent or rheology modifier to fix the stability, and requires optimization of ratios of ingredients.

An example of such a formulation is U.S. Pat. No. 5,798,329, which discloses germicidal liquid laundry detergent compositions. The liquid detergent compositions are aqueous compositions which comprise: A) 1-40 parts by weight of one or more anionic surfactant compositions selected from alkyl ether carboxylates and alkyl ether sulfonates; B) 1-25 parts by weight of one or more quaternary ammonium surfactant compositions having germicidal properties; C) 3-50 parts by weight of one or more nonionic surfactant compositions selected from linear and secondary alcohol alkoxylates, alkylphenol ethoxylates, alkyl polyglycosides, amine oxides, alkanolamides; D) 0-10 parts by weight of one or more anionic co-surfactant compositions selected from alkyl sulfates, alkyl sulfonates, alkyl ether sulfates, alkyl aryl sulfonates, alkyl aryl ether sulfates. The weight ratios of B:A are at 1:2 to 2.5:2.

WO1998056886A1 discloses an antibacterial fabric softener composition suitable for imparting antibacterial properties to a fabric, comprising one or more cationic antibacterial agent(s) in an amount in excess of the amount needed for antibacterial activity in the softener, together with conventional fabric softener components. Marlosoft IQ90 (imidazolinium type fabric softeners) are exemplified. A comparative example using Esterquat was indicated to be biphasic and containing small lumps (i.e., unstable).

Other antibacterial fabric softeners are known. GB1089010A discloses a germicidal fabric softening composition which forms a stable aqueous solution, comprising a cationic softening agent which is a water-soluble 1-lower alkyl, 1-long chain alkyl amidoethyl, 2-long chain alkyl imidazolinium salt, and a germicidal agent which is a water-soluble N—$C_{11-20}$ alkyl, N,N-di-$C_{1-3}$ alkyl N-benzyl (or substituted benzyl) ammonium salt. The composition may also contain a salt, base, or strong acid as a compatible stabilizing additive. However, these compositions do not contain a water-insoluble softening agent, such as those that are commonly used in commercial formulas.

A germicidal concentrated laundry softener is disclosed in CH617456A5, characterized by having a) 30 to 60% by weight of a cationic fabric softener, b) 5 to 20% by weight of a cationic disinfectant, c) 5 to 20% by weight of a nonionic dispersant, d) 15 to 40 wt. % lower alkanols and optionally e) water in amounts corresponding to the balance to 100 wt. %. They are preferably dosed in amounts of 8 to 15 ml per rinse cycle with about 4 kg of laundry. It is claimed that these compositions are more stable than diluted formulations and that a non-ionic dispersant is essential to ensure the concentrate is readily dispersible in cold water.

There remains a need in the art for stable, non-concentrated fabric softening compositions comprising ester quats that have germicidal properties provided by commonly used water-insoluble cationic quaternary ammonium salts.

It was found by the inventors that, like in detergent compositions, cationic surfactant germicides present technical challenges when they are used in fabric softening compositions that comprise ester quaternary ammonium salts. It was not obvious from the prior art why water-soluble quaternary ammonium salts would be incompatible with insoluble quaternary ammonium salt. Without being bound by theory, it is hypothesized that quaternary ammonium germicides behave similarly as Na, Ca or ammonium chloride salts that can provide significant thinning effect to fabric softening composition, resulting into faster phase separation of insoluble particles. It is discovered in this invention that the introduction of a cationic polymer can effectively solve the stability problem in the fabric treatment composition that comprises both water-soluble cationic surfactant germicides and insoluble cationic softening agent.

Therefore, it is an object of the invention to provide improved fabric softening compositions, particularly those which provide an antibacterial effect so as to sanitize treated textiles or garments.

It is an object of the invention to provide a process for adding cationic, water-soluble germicidal active agents in effective amounts to fabric softening compositions comprising water-insoluble ester quats.

It is further an object the invention to provide a method for preparing and for determining stability of a liquid fabric softener formulation comprising water-soluble cationic germicidal active agents, cationic polymer, and water-insoluble ester quats.

Such compositions are particularly useful in the laundering of garments and/or textiles particularly when used in conjunction with commercial or residential washing machine designed for the laundering of garments and/or textiles.

SUMMARY OF THE INVENTION

The foregoing objectives are achieved by provision of liquid fabric softener compositions comprising water-insoluble cationic softeners, water-soluble cationic antibacterial agents and cationic rheology modifying polymer that are stable homogenous mixtures. Also provided are methods for determining stability of liquid fabric softener formulation comprising such ingredients, methods for preparing stable fabric softening formulations comprising such ingredients, and methods of using the compositions. In some embodiments, the compositions do not contain a non-ionic or an anionic polymer.

In a first aspect, a liquid fabric softener composition is provided comprising a homogeneous dispersion of (a) from 0.5% to 20% by weight water-insoluble quaternary ester or diester ammonium salt; (b) from 0.5% to 10% by weight of one or more water-soluble cationic antibacterial agents; (c) from 0.05% to 5% by weight cationic acrylics polymer; and (d) water.

In some embodiments, the present application provides compositions consisting essentially of components (a), (b), (c) and (d) described above. In other embodiments, the present application provides compositions consisting of components (a), (b), (c) and (d) described above. In yet other embodiments, the present application provides compositions consisting of (a), (b), (c) and (d), a preservative, dye and fragrance.

In certain embodiments, the fabric softener does not contain a nonionic polymer or an anionic polymer. In certain of those embodiments, the fabric softener does not contain a nonionic polymer and the fabric softener does not contain an anionic polymer.

In preferred embodiments, the composition is stable when stored at 25° C. for 7 days. As used herein the term "stable" refers to a composition that is dispersed and having no visible phase separation.

In some embodiments, a sum of the amount of water-insoluble quaternary ester or diester ammonium salt plus 3 times the amount of the cationic acrylics polymer is greater than or equal to 2.5 times the amount of the water-soluble cationic antibacterial agent, i.e., (a)+3(c)≥2.5(b).

In some embodiments, the water-insoluble quaternary ester or diester ammonium salt is selected from a compound having the formula (III), formula (IV), or mixtures thereof $$[(CH_3)_2N^+(CH_2CH_2OC(O)—R)_2]X^- \quad (III)$$

$$[(HOCH_2CH_2)(CH_3)N^+(CH_2CH_2OC(O)—R)_2]X^- \quad (IV)$$

wherein

R=linear saturated or unsaturated alkyl radical of 8 to 19 carbon atoms, and $X^-$ is a halide, methyl sulfate, ethyl sulfate, methyl phosphate, nitrate, acetate, or phosphate ion.

It is noted that C(O) as shown in formula (III) or (IV) represents a carbon atom attached to an oxygen atom by a double bond In certain embodiments, the water-insoluble quaternary ester or diester ammonium salt is selected from a compound of formula (II) and mixtures thereof (II)

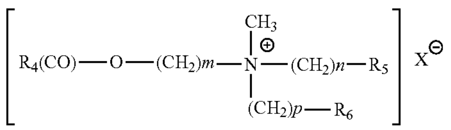

wherein $R_4$ is an aliphatic alkyl radical of 12 to 22 carbon atoms which has 0, 1, 2 or 3 double bonds;

$R^5$ is H, OH or O—(CO)$R^7$, $R^6$ is H, OH or O—(CO)$R^8$ independently of $R^5$, $R_7$ and $R_6$ each being independently an aliphatic alkyl radical of 12 to 22 carbon atoms which has 0, 1, 2 or 3 double bonds, m, n, and p are each independently 1, 2 or 3, and $X^-$ is a halide, methyl sulfate, ethyl sulfate, methyl phosphate, nitrate, acetate, or phosphate ion.

In some embodiments where the composition contains a compound of formula (II), $R_5$ is O—(CO)$R_7$, $R_4$ and $R_7$ are alkyl radicals having 16 to 18 carbon atoms, and $R_6$ is OH. C(O) as shown in formula (II) represents a carbon atom attached to an oxygen atom by a double bond.

In certain embodiments, the water-soluble cationic antibacterial agent is selected from one or more quaternary ammonium salts. In some of those embodiments, the quaternary ammonium salt is selected from a compound of formula (VII) and mixtures thereof:

(VII)

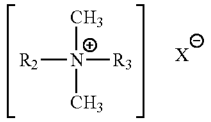

wherein $R_2$ and $R_3$ are the same or different $C_8$-$C_{12}$ alkyl, or $R_2$ is $C_{12-16}$ alkyl, $C_{8-18}$ alkylethoxy, $C_{8-18}$ alkylphenoxyethoxy and $R_3$ is benzyl, and $X^-$ is a halide or methosulfate.

In some embodiments, the one or one or more water-soluble cationic antibacterial agents is a mixture of alkyl dimethyl benzylammonium chloride, octyl decyl dimethylammonium chloride, dioctyl dimethylammonium chloride, and didecyl dimethylammonium chloride In certain embodiments, the cationic acrylics polymer is a compound of formula (IX) or mixtures thereof:

(IX)

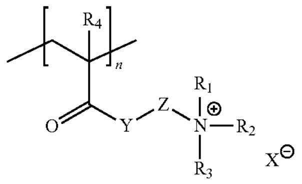

wherein $R^4$ is H or $CH_3$,

Y is O or NH;

Z is a linear alkyl chain of methylene units $(CH_2)_x$, where x is an integer from 2 to 18; a substituted alkyl chain from 2 to 18 carbons in length having at least one hydroxyl group anywhere along the chain length; a benzene ring wherein the Y and the N substituents attach to the intervening benzene ring in a para relationship; or a branched alkyl chain having a total number of carbons atoms from 2 to 18 carbon atoms;

$R_1$, $R_2$, and $R_3$ are, independently, —$CH_3$, —$CH_2$—$C_6H_5$, —$C_2H_5$, -n-$C_6H_{13}$, -n-$C_{10}H_{21}$, -naphthalenyl, -benzofuranyl, or —$CH_2$—$C_6H_4$—$CH_2$—O—$C_6H_4$—CHO;

X is an anion chosen from the group consisting of halides, sulfates, methosulfate, trifluoromethane sulfonate, tetrafluoroborate, carbonates, bicarbonates, and mixtures thereof; and n is between 200 to about 100 million.

In certain preferred embodiments, the compound of formula (IX) is N,N,N-Trimethyl-2-((2-methyl-1-oxo-2-propenyl)oxy)ethanaminium chloride homopolymer. In some of those embodiments, the composition comprises about 0.1% to about 2% by weight N,N,N-Trimethyl-2-((2-methyl-1-oxo-2-propenyl)oxy)ethanaminium chloride homopolymer.

In preferred embodiments, water constitutes greater than 50% by weight of the composition.

In some embodiments, the composition is free or substantially free of an anionic polymer or anionic surfactant, and/or a nonionic polymer or a nonionic surfactant.

In a second aspect, an antibacterial fabric softener composition is provided comprising from 1% to 40% by weight ditallowethyl ester dimethyl ammonium chloride or di tallowethyl hydroxyethylmonium methosulfate; one or more water-soluble cationic antibacterial agents; from 0.05 to 5.0% by weight N,N,N-Trimethyl-2-((2-methyl-1-oxo-2-propenyl)oxy)ethanaminium chloride homopolymer; and water.

In certain embodiments, the fabric softener does not contain a nonionic polymer or an anionic polymer. In certain of those embodiments, the fabric softener does not contain a nonionic polymer and the fabric softener does not contain an anionic polymer.

In some embodiments, the present application provides fabric softener compositions consisting essentially of ditallowethyl ester dimethyl ammonium chloride or di tallowethyl hydroxyethylmonium methosulfate, one or more water-soluble cationic antibacterial agents, N,N,N-Trimethyl-2-((2-methyl-1-oxo-2-propenyl)oxy)ethanaminium chloride homopolymer and water.

In other embodiments, the present application provides compositions consisting of ditallowethyl ester dimethyl ammonium chloride or di tallowethyl hydroxyethylmonium methosulfate, one or more water-soluble cationic antibacterial agents, N,N,N-Trimethyl-2-((2-methyl-1-oxo-2-propenyl)oxy)ethanaminium chloride homopolymer and water.

In yet other embodiments, the present application provides compositions consisting of ditallowethyl ester dimethyl ammonium chloride or di tallowethyl hydroxyethylmonium methosulfate, one or more water-soluble cationic antibacterial agents, N,N,N-Trimethyl-2-((2-methyl-1-oxo-2-propenyl)oxy)ethanaminium chloride homopolymer and water, a preservative, dye and fragrance.

In some embodiments the antibacterial fabric softener composition comprises about 0.2% to about 1% by weight N,N,N-Trimethyl-2-((2-methyl-1-oxo-2-propenyl)oxy) ethanaminium chloride homopolymer.

In certain embodiments, the composition comprises about 2% to about 8% by weight ditallowethyl ester dimethyl ammonium chloride.

In some embodiments, the composition comprises about 2% to about 3% by weight one or more water-soluble cationic antibacterial agents, the one or more water-soluble cationic antibacterial agents selected from the group consisting of alkyl dimethyl benzylammonium chloride, octyl decyl dimethylammonium chloride, dioctyl dimethylammonium chloride, didecyl dimethylammonium chloride, and mixtures thereof.

In certain embodiments, a ratio of a sum of the amount of the ditallowethyl ester dimethyl ammonium chloride or di tallowethyl hydroxyethylmonium methosulfate plus 3 times the amount of the water-soluble cationic antibacterial agents to the amount of the N,N,N-Trimethyl-2-((2-methyl-1-oxo-2-propenyl)oxy)ethanaminium chloride homopolymer is 2.5 or greater.

In preferred embodiments, water constitutes greater than 50% by weight of the composition.

In some embodiments, the composition is free or substantially free of an anionic polymer or an anionic surfactant, or a nonionic polymer or a nonionic surfactant.

In a third aspect, the invention provides a liquid fabric softener composition comprising (a) water-insoluble quaternary ester or diester ammonium salt; (b) water-soluble cationic antibacterial agent of formula (VIII) as described above and (c) a cationic polymer of formula (IX) as described above, wherein a total of the amount of the water-insoluble quaternary ester or diester ammonium salt plus 3 times the amount of the cationic polymer of formula (IX) is greater than or equal to 2.5 times the amount of the water-soluble cationic antibacterial agent of formula (VIII), i.e., $(a)+3(c)\geq 2.5(b)$.

In certain embodiments, the fabric softener does not contain a nonionic polymer or an anionic polymer. In certain of those embodiments, the fabric softener does not contain a nonionic polymer and the fabric softener does not contain an anionic polymer.

In some embodiments, the present application provides a liquid fabric softener consisting essentially of (a) water-insoluble quaternary ester or diester ammonium salt; (b) water-soluble cationic antibacterial agent of formula (VIII), (c) a cationic polymer of formula (IX), and water.

In other embodiments, the present application provides a liquid fabric softener consisting of (a) water-insoluble quaternary ester or diester ammonium salt; (b) water-soluble cationic antibacterial agent of formula (VIII), (c) a cationic polymer of formula (IX), and water.

In yet other embodiments, the present application provides a liquid fabric softener consisting of (a) water-insoluble quaternary ester or diester ammonium salt; (b) water-soluble cationic antibacterial agent of formula (VIII), (c) a cationic polymer of formula (IX), water, a preservative, dye, and fragrance.

In preferred embodiments, the composition is stable when stored at 25° C. for 7 days. As used herein the term "stable" refers to a composition that is dispersed and having no visible phase separation.

In certain embodiments, a ratio of a sum of the amount of (a) and 3 times the amount of (c) to the amount of (b) is 2.5:1 or greater than 2.5:1.

In some embodiments, the water-insoluble quaternary ester or diester ammonium salt is selected from a compound having formula (I), formula (II), formula (III), formula (IV), or mixtures thereof.

In certain embodiments, the water-insoluble quaternary ester or diester ammonium salt comprises, consists essentially of, or consists of ditallowethyl ester dimethyl ammonium chloride (DEQ).

In some embodiments, the water-insoluble quaternary ester or diester ammonium salt comprises, consists essentially of, or consists of ditallowethyl hydroxyethylmonium metho sulfate (TEQ).

In certain embodiments, the one or more water-soluble cationic antibacterial agents are selected from the group consisting of alkyl dimethyl benzylammonium chloride, octyl decyl dimethylammonium chloride, dioctyl dimethylammonium chloride, didecyl dimethylammonium chloride, and mixtures thereof.

In some embodiments, the compound of formula (IX) is N,N,N-Trimethyl-2-((2-methyl-1-oxo-2-propenyl)oxy) ethanaminium chloride homopolymer.

In preferred embodiments, water constitutes greater than 50% by weight of the composition.

In some embodiments, the composition is free or substantially free of an anionic polymer or an anionic surfactant, or a nonionic polymer or a nonionic surfactant.

The various compositions described herein are for use for imparting softening and/or antibacterial properties to fabric, and for use as an antibacterial agent.

In another aspect, the invention provides a method for determining stability of a liquid fabric softener formulation, comprising the steps of:

(i) providing the liquid fabric softener formulation that comprises:

(a) a water-insoluble quaternary ester or diester ammonium salt;

(b) a water-soluble cationic antibacterial agent of formula (VIII):

(VIII)

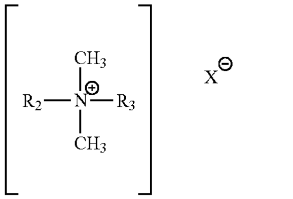

wherein $R_2$ and $R_3$ are the same or different $C_8$-$C_{12}$ alkyl, or $R_2$ is $C_{12-16}$ alkyl, $C_{8-18}$ alkylethoxy, $C_{8-18}$ alkylphenoxyethoxy, $R_3$ is benzyl, and X is a halide or is methosulfate; and (c) a cationic polymer of formula (IX):

(IX)

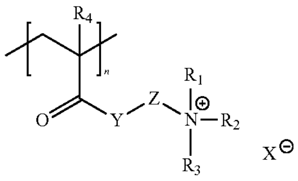

wherein $R^4$ is H or $CH_3$,

Y is O or NH;

Z is a linear alkyl chain of methylene units $(CH_2)x$, where x is an integer from 2 to 18, a substituted alkyl chain from 2 to 18 carbons in length having at least one hydroxyl group anywhere along the chain length, a benzene ring wherein the Y and the N substituents attach to the benzene ring in a para relationship, or a branched alkyl chain having a total number of carbons atoms from 2 to 18 carbon atoms;

$R^1$, $R^2$, and $R^3$ are, independently, —$CH_3$, —$CH_2$—$C_6H_5$, —$C_2H_5$, -n-$C_6H_{13}$, -n-$C_{10}H_{21}$, -naphthalenyl, -benzofuranyl, or —$CH_2$—$C_6H_4$—$CH_2$—O—$C_6H_4$—CHO;

X is an anion chosen from the group consisting of halides, sulfates, methosulfate, trifluoromethane sulfonate, tetrafluoroborate, carbonates, bicarbonates, and mixtures thereof, and n is between 200 to about 100 million, and (ii) calculating a stability index of the formulation according to the following equation:

Stability formula index=[(wt % of the (a) component+3*(wt % of the (c) component)]/[wt % of the (b) component].

In some embodiments, the method for determining stability of a liquid fabric softener formulation further comprises a step of comparing the stability index of two different formulations to determine relative stability, wherein the greater the index, the more stable the formulation.

In certain embodiments, the method for determining stability of a liquid fabric softener formulation further comprises a step of suggesting reformulation if the stability index is less than 2.5.

In some embodiments, (a) is selected from a compound of formula (II) and mixtures thereof (II)

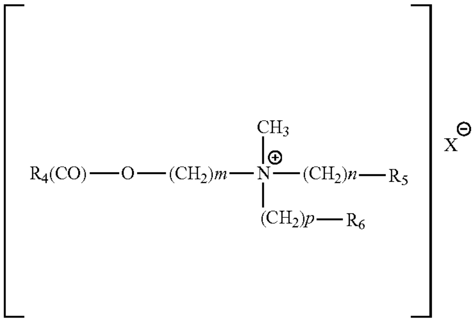

wherein $R_4$ is an aliphatic alkyl radical of 12 to 22 carbon atoms which has 0, 1, 2 or 3 double bonds;

$R_5$ is H, OH or O—(CO)$R_7$, $R_6$ is H, OH or O—(CO)$R_8$ independently of $R^5$, $R_7$ and $R_6$ each being independently an aliphatic alkyl radical of 12 to 22 carbon atoms which has 0, 1, 2 or 3 double bonds, m, n, and p are each independently 1, 2 or 3, and $X^-$ is a halide, methyl sulfate, ethyl sulfate, methyl phosphate, nitrate, acetate, or phosphate ion. In some of those embodiments, $R_5$ is O—(CO)$R_7$, $R_4$ and $R_7$ are alkyl radicals having 16 to 18 carbon atoms, and $R_6$ is OH.

In certain embodiments, (a) is ditallowethyl ester dimethyl ammonium chloride or di tallowethyl hydroxyethylmonium methosulfate or (a) is selected from a compound having formula (III), formula (IV), and mixtures thereof $$[(CH_3)_2N^+(CH_2CH_2OC(O)—R)_2]X^- \quad (III)$$

$$[(HOCH_2CH_2)(CH_3)N^+(CH_2CH_2OC(O)—R)_2]X^- \quad (IV)$$

wherein

R=linear saturated or unsaturated alkyl radical of 8 to 19 carbon atoms, and $X^-$ is a halide, methyl sulfate, ethyl sulfate, methyl phosphate, nitrate, acetate, or phosphate ion.

In some embodiments, (b) is a mixture of alkyl dimethyl benzylammonium chloride, octyl decyl dimethylammonium chloride, dioctyl dimethylammonium chloride, and didecyl dimethylammonium chloride.

In certain embodiments, the compound of formula (IX) is N,N,N-Trimethyl-2-((2-methyl-1-oxo-2-propenyl)oxy) ethanaminium chloride homopolymer.

In yet another aspect, the invention provides a method of preparing a stable liquid fabric softener formulation, comprising the steps of:

(i) providing an effective amount of a water-insoluble quaternary ester or diester ammonium salt for desired softening effects and an effective amount of a water-soluble cationic antibacterial agent of formula (VIII) for desired antibacterial effects:

(VIII)

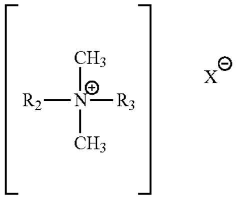

wherein $R_2$ and $R_3$ are the same or different $C_8$-$C_{12}$ alkyl, or $R_2$ is $C_{12-16}$ alkyl, $C_{8-18}$ alkylethoxy, $C_{8-18}$ alkylphenoxyethoxy and $R_3$ is benzyl, and X is a halide or is methosulfate;

(ii) picking a desirable stability formula index value, wherein the desirable stability formula index value is 2.5 or greater than 2.5;

(iii) determining an amount of a cationic polymer of formula (IX) needed to make a stable formulation according to following equation:

amount of the cationic polymer equals or is greater than: [(Stability formula index*the amount of the cationic antibacterial agent of formula (VIII))−the amount of the quaternary ester or diester ammonium salt]/3 wherein the cationic polymer of formula (IX) is:

(IX)

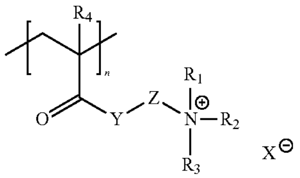

wherein $R^4$ is H or $CH_3$,

Y is O or NH;

Z is a linear alkyl chain of methylene units $(CH_2)x$, where x is an integer from 2 to 18, a substituted alkyl chain from 2 to 18 carbons in length having at least one hydroxyl group anywhere along the chain length, a benzene ring wherein the Y and the N substituents attach to the benzene ring in a para relationship, or a branched alkyl chain having a total number of carbons atoms from 2 to 18 carbon atoms;

$R^1$, $R^2$, and $R^3$ are, independently, $—CH_3$, $—CH_2—C_6H_5$, $—C_2H_5$, -n-$C_6H_{13}$, -n-$C_{10}H_{21}$, -naphthalenyl, -benzofuranyl, or $—CH_2—C_6H_4—CH_2—O—C_6H_4—CHO$;

X is an anion chosen from the group consisting of halides, sulfates, methosulfate, trifluoromethane sulfonate, tetrafluoroborate, carbonates, bicarbonates, and mixtures thereof, and n is between several hundred to about 100 million; and (iv) preparing the stable fabric softener formulation containing the quaternary ester or diester ammonium salt, the water-soluble cationic antibacterial agent of formula (VIII), and the cationic polymer in their respective amounts.

In some embodiments, the method of preparing a stable liquid fabric softener formulation further comprises a step of adjusting components of the fabric softener formulation to adjust its stability formula index.

In certain embodiments, the water-insoluble quaternary ester or diester ammonium salt is selected from a compound of formula (II) and mixtures thereof (II)

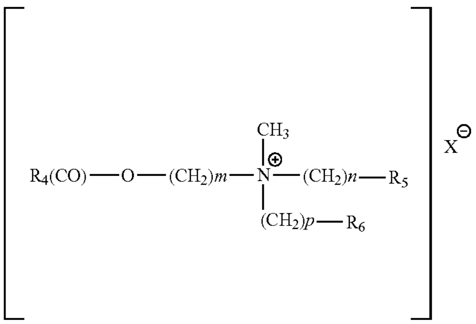

wherein $R_4$ is an aliphatic alkyl radical of 12 to 22 carbon atoms which has 0, 1, 2 or 3 double bonds;

$R_5$ is H, OH or $O—(CO)R_7$, $R_6$ is H, OH or $O—(CO)R_8$ independently of $R^5$, $R_7$ and $R_6$ each being independently an aliphatic alkyl radical of 12 to 22 carbon atoms which has 0, 1, 2 or 3 double bonds, m, n, and p are each independently 1, 2 or 3, and $X^-$ is a halide, methyl sulfate, ethyl sulfate, methyl phosphate, nitrate, acetate, or phosphate ion. In certain of those embodiments, $R_5$ is $O—(CO)R_7$, $R_4$ and $R_7$ are alkyl radicals having 16 to 18 carbon atoms, and $R_6$ is OH.

In some embodiments, the water-insoluble quaternary ester or diester ammonium salt is ditallowethyl ester dimethyl ammonium chloride or di tallowethyl hydroxyethylmonium methosulfate, or a combination thereof.

In certain embodiments, the water-insoluble quaternary ester or diester ammonium salt is selected from a compound having formula (III), formula (IV), and mixtures thereof $$[(CH_3)_2N^+(CH_2CH_2OC(O)—R)_2]X^- \quad (III)$$

$$[(HOCH_2CH_2)(CH_3)N^+(CH_2CH_2OC(O)—R)_2]X^- \quad (IV)$$

wherein R=linear saturated or unsaturated alkyl radical of 8 to 19 carbon atoms, and $X^-$ is a halide, methyl sulfate, ethyl sulfate, methyl phosphate, nitrate, acetate, or phosphate ion.

In some embodiments, the water-soluble cationic antibacterial agent of formula (VIII) is a mixture of alkyl dimethyl benzylammonium chloride, octyl decyl dimethylammonium chloride, dioctyl dimethylammonium chloride, and didecyl dimethylammonium chloride.

In certain embodiments, the compound of formula (IX) is N,N,N-Trimethyl-2-((2-methyl-1-oxo-2-propenyl)oxy) ethanaminium chloride homopolymer.

The invention also provides a method for imparting antimicrobial properties to a fabric, comprising adding to the final rinse cycle of textile laundry a composition as described herein.

Further, a method for enhancing stability of a fabric softening composition comprises adding to the composition a quaternary ester or diester ammonium salt, a cationic antibacterial agent, and a cationic acrylic polymer.

In a further aspect, the invention provides use of the compositions described herein for imparting softening and/or antibacterial properties to a fabric.

In yet a further aspect, the invention provides use of the compositions described herein as antibacterial agents.

Moreover, the invention provides use of a cationic acrylic polymer to stabilize a fabric softening composition containing a quaternary ester or diester ammonium salt and a cationic antibacterial agent.

BRIEF DESCRIPTION OF THE DRAWINGS

The FIGURE contains two photographs illustrating fabric softener compositions made in accordance with Example 1 after storage at 25° C. for 7 days. The left image corresponds to a formula containing esterquat, antibacterial agent, nonionic polymer and water. The right image corresponds to a formula containing esterquat, antibacterial agent, cationic polymer and water.

DETAILED DESCRIPTION OF THE INVENTION

The following description is of exemplary embodiments only and is not intended to limit the scope, applicability, or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

That said, provided herein are fabric treatment compositions that comprise both a water-insoluble softening agent and a water-soluble germicidal surfactant, and both of which are quaternary ammonium salts. In addition, a preferred formulation space of easter quat, cationic polymer and germicidal cationic surfactants are disclosed based on a stability formula index.

Compositions

The present application provides compositions consisting essentially of water-insoluble quaternary ester or diester ammonium salt, one or more water-soluble cationic antibacterial agents, cationic acrylics polymer and water. The present application also provides compositions consisting of water-insoluble quaternary ester or diester ammonium salt, one or more water-soluble cationic antibacterial agents, cationic acrylics polymer and water. The present invention further provides compositions consisting of water-insoluble quaternary ester or diester ammonium salt, one or more water-soluble cationic antibacterial agents, cationic acrylics polymer, water, a preservative, fragrance, and dye.

Quaternary Compounds Useful for Fabric Softening

The fabric softeners according to the invention contain as compulsory component a fabric softening component, in particular cationic surfactant. In accordance with various embodiments of the present invention, the liquid fabric softener compositions comprise a quaternary ammonium cationic surfactant. For brevity, these cationic materials will be referred to as quaternary surfactants with the understanding that they are quaternized nitrogen species (i.e., cationic) and necessarily have an anionic counterion. In this regard, a variety of quaternary surfactants may be utilized. However, acyclic quaternary surfactants are preferred for fabric softener actives. For example, useful quaternary synthetic surfactants that are acyclic include linear alkyl, branched alkyl, hydroxyalkyl, oleylalkyl, acyloxyalkyl, diamidoamine, or diester quaternary ammonium compounds. The preferred quaternary surfactants for use in the present invention are the ester and diester quaternary surfactants and the diamidoamine quaternary blends. Imidazolines are not preferred in the present invention but remain useful as softener actives.

The quaternary surfactant actives can range from about 0.5% to about 40% by weight of the fabric softener composition. In accordance with a preferred embodiment, the quaternary surfactant is at a level from about 0.5% to about 20% by weight of the fabric softener composition, and preferably from about 1% to about 15%, based on the total weight of the composition. In certain embodiments, the quaternary surfactant is at a level of about 2% to about 8% by weight of the fabric softener composition.

Examples of acyclic quaternary surfactant fabric-softening components useful in the present invention are shown by the general formulas (I) and (II):

(I)

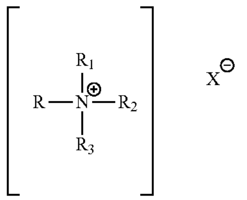

(II)

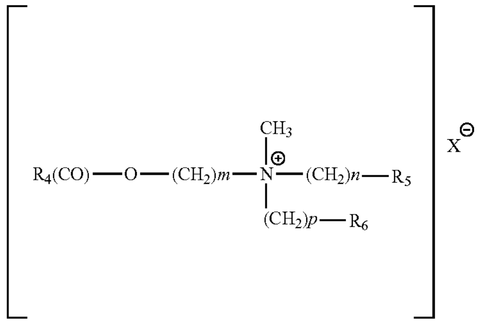

wherein for general formula (I), R and $R_1$ are individually selected from the group consisting of $C_1$-$C_4$ alkyl, benzyl, and —$(C_2H_4O)_xZ$ where x has a value from 1 to 20 and Z is hydrogen or $C_1$-$C_3$ alkyl; $R^2$ and $R^3$ are each a $C_8$-$C_{30}$ alkyl or $R_2$ is a $C_8$-$C_{30}$ alkyl and $R_3$ is selected from the group consisting of $C_1$-$C_5$ alkyl, benzyl, and $-(C_2H_4O)_x-H$ where x has a value from 2 to 5; and where $X^-$ represents an anion selected from the group consisting of halides, methyl sulfate, ethyl sulfate, methyl phosphate, acetate, nitrate or phosphate ion and mixtures thereof. Specific examples of quaternary surfactants described within the general formula (I) include alkyltrimethylammonium compounds, dialkyldimethylammonium compounds and trialkylmethylammonium compounds including but not limited to, tallow trimethyl ammonium chloride, ditallow dimethyl ammonium chloride, ditallow dimethyl ammonium methyl sulfate, dihexadecyl dimethyl ammonium chloride, di-(hydrogenated tallow) dimethyl ammonium chloride, dioctadecyl dimethyl ammonium chloride, dieicosyl dimethyl ammonium chloride, didocosyl dimethyl ammonium chloride, di-(hydrogenated tallow) dimethyl ammonium methyl sulfate, dihexadecyl dimethyl ammonium acetate, ditallow dipropyl ammonium phosphate, ditallow dimethyl ammonium nitrate, di-(coconut-alkyl)dimethyl ammonium chloride, cetyltrimethylammonium chloride, stearyltrimethylammonium chloride, distearyldimethylammonium chloride, lauryldimethylammonium chloride, and tricetylmethylammonium chloride, along with other quaternary compounds such as trihydroxyethylmethylammonium methosulfate, lauryldimethylbenzylammonium chloride, and the like.

Quaternary surfactants of the formula (II) are known as ester quats. Ester quats are notable for excellent biodegradability. In the formula (II), $R_4$ represents an aliphatic alkyl radical of 12 to 22 carbon atoms which has 0, 1, 2 or 3 double bonds; $R_5$ represents H, OH or O—(CO)$R_7$, $R_6$ represents H, OH or O—(CO)$R_8$ independently of $R_5$, with $R_7$ and $R_8$ each being independently an aliphatic alkyl radical of 12 to 22 carbon atoms which has 0, 1, 2 or 3 double bonds. m, n, and p are each independently 1, 2 or 3. $X^-$ may be a halide, methyl sulfate, ethyl sulfate, methyl phosphate, nitrate, acetate, or phosphate ion and also mixtures thereof. Useful are compounds wherein $R_5$ is O—(CO) $R_7$ and $R_4$ and $R_7$ are alkyl radicals having 16 to 18 carbon atoms, particularly compounds wherein $R_6$ also represents OH. Examples of compounds of the formula (II) include methyl-N-(2-hydroxyethyl)-N,N-di-(tallow acyloxyethyl) ammonium methyl sulfate, bis-(palmitoyl)-ethylhydroxyethyl methyl ammonium methyl sulfate or methyl-N,N-bis (acyloxyethyl)-N-(2-hydroxyethyl)ammonium methyl sulfate. In quaternary surfactants of the formula (II) which comprise unsaturated alkyl chains, preference is given to acyl groups whose corresponding fatty acids have an iodine number between 5 and 80, preferably between 10 and 60 and especially between 15 and 45 and also a cis/trans isomer ratio (in % by weight) of greater than 30:70, preferably greater than 50:50 and especially greater than 70:30.

Further ester quats of use in the present invention have the formulas (III) or (IV)

$$[(CH_3)_2N^+(CH_2CH_2OC(O)-R)_2]X^- \quad \text{(III)}$$

$$[(HOCH_2CH_2)(CH_3)N^+(CH_2CH_2OC(O)-R)_2]X^- \quad \text{(IV)}$$

where R=linear saturated or unsaturated alkyl radical of 8 to 19 and preferably 13 to 17 carbon atoms. In a particularly preferred embodiment, the fatty acid residues are tallow fatty acid residues. $X^-$ represents either a halide, for example chloride or bromide, methyl phosphate, ethyl phosphate, methyl sulfate, ethyl sulfate, acetate, nitrate, phosphate and also mixtures thereof.

Further useful acyclic quaternary ammonium fabric-softening agents include the diester quats of the formula (III), which provide stability and color protection as well as softness:

(V)

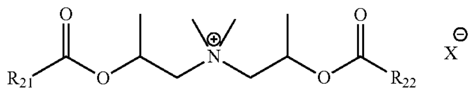

wherein $R^{21}$ and $R^{22}$ each independently represent an aliphatic radical of 12 to 22 carbon atoms which has 0, 1, 2 or 3 double bonds.

It is likewise possible to use amidoamine quaternary surfactants of the formula (IV):

(VI)

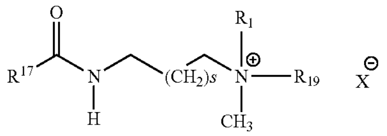

wherein $R^{17}$ may be an aliphatic alkyl radical having 12 to 22 carbon atoms with 0, 1, 2 or 3 double bonds, s can assume values between 0 and 5, $R^{18}$ and $R^{19}$ are, independently of one another, each H, $C_{1-4}$-alkyl or hydroxyalkyl. Preferred compounds are fatty acid amidoamines such as stearylamidopropyldimethylamine or the 3-tallowamidopropyltrimethylammonium methyl sulfate, which are characterized not only by a good conditioning effect, but also by color-transfer-inhibiting effect and in particular by their good biodegradability. Particular preference is given to alkylated quaternary ammonium compounds in which at least one alkyl chain is interrupted by an ester group and/or amido group, in particular N-methyl-N-(2-hydroxyethyl)-N,N-(ditallowacyloxyethyl)ammonium methyl sulfate and/or N-methyl-N-(2-hydroxyethyl)-N,N-(palmitoyloxyethyl)ammonium methyl sulfate.

Antibacterial Agent

The fabric softener composition comprises from about 0.2% to about 10% cationic antibacterial agent. Cationic surfactants which exhibit germicidal activity and which may be used in the softener compositions include certain quaternary ammonium surfactants, of which one or more such cationic surfactants may be used. Illustrative and non-limitative examples of the suitable quaternary ammonium compounds are alkyl dimethyl benzyl and dialkyl dimethyl ammonium chloride, didecyl dimethyl ammonium chloride, mixed dialkyl dimethyl ammonium chloride, dioctyl dimethyl ammonium chloride, alkyl dimethyl benzyl ammonium chloride, dialkyl methyl benzyl ammonium chloride, and alkyl dimethyl ethyl benzyl ammonium chloride Exemplary useful quaternary ammonium compounds and salts thereof include quaternary ammonium germicides which may be characterized by the general structural formula (V):

(VII)

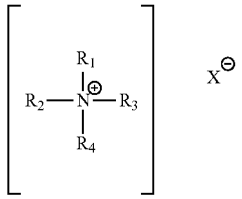

where at least one or $R_1$, $R_2$, $R_3$ and $R_4$ is a hydrophobic, aliphatic, aryl aliphatic or aliphatic aryl radical of from 6 to 26 carbon atoms, and the entire cation portion of the molecule has a molecular weight of preferably at least 165. The hydrophobic radicals may be long-chain alkyl, long-chain alkoxy aryl, long-chain alkyl aryl, halogen-substituted long-chain alkyl aryl, long-chain alkyl phenoxy alkyl, aryl alkyl, etc. The remaining radicals on the nitrogen atoms other than the hydrophobic radicals are substituents of a hydrocarbon structure usually containing a total of no more than 12 carbon atoms. The radicals $R_1$, $R_2$, $R_3$ and $R_4$ may be straight chained or may be branched, but are preferably straight chained, and may include one or more amide or ester linkages. The radical X may be any salt-forming anionic radical.

Exemplary quaternary ammonium salts within the above description include the alkyl ammonium halides such as cetyl trimethyl ammonium bromide, alkyl aryl ammonium halides such as octadecyl dimethyl benzyl ammonium bromide, N-alkyl pyridinium halides such as N-cetyl pyridinium bromide, and the like. Other suitable types of quaternary ammonium salts include those in which the molecule contains either amide or ester linkages such as octyl phenoxy ethoxy ethyl dimethyl benzyl ammonium chloride, N-(laurylcocoaminoformylmethyl)-pyridinium chloride, and the like. Other very effective types of quaternary ammonium compounds which are useful as germicides include those in which the hydrophobic radical is characterized by a substituted aromatic nucleus as in the case of lauryloxyphenyltrimethyl ammonium chloride, cetylaminophenyltrimethyl ammonium methosulfate, dodecylphenyltrimethyl ammonium methosulfate, dodecylbenzyltrimethyl ammonium chloride, chlorinated dodecylbenzyltrimethyl ammonium chloride, and the like.

Preferred quaternary ammonium compounds which act as germicides and which are be found useful in the practice of the present invention include those which have the structural formula (VIII):

(VIII)

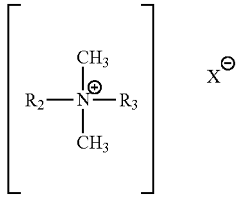

wherein $R_2$ and $R_3$ are the same or different $C_8$-$C_{12}$ alkyl, or $R_2$ is $C_{12-16}$ alkyl, $C_{8-18}$ alkylethoxy, $C_8$-18 alkylphenoxyethoxy and $R_3$ is benzyl, and X is a halide, for example chloride, bromide or iodide or is methosulfate. The alkyl groups recited in $R_2$ and $R_3$ may be straight chained or branched, but are preferably substantially linear.

Such quaternary germicides are usually sold as mixtures of two or more different quaternaries, such as mixtures having 20%-40% by weight alkyl dimethyl benzylammonium chloride, 15%-30% by weight octyl decyl dimethylammonium chloride, 6%-12% by weight dioctyl dimethylammonium chloride, and 9%-18% by weight didecyl dimethylammonium chloride. Further useful quaternary germicidal agents include dialkyl dimethyl ammonium chlorides and blends of alkyl dimethyl benzylammonium chlorides.

In a preferred embodiment, the quaternary germicide has the following composition of actives:

| | |
|---|---|
| Alkyl (C14 50%, C12 40%, C16 10%) Dimethyl benzyl ammonium chloride | 40% |
| Octyl Decyl dimethyl ammonium chloride | 30% |
| Dioctyl dimethyl ammonium chloride | 12% |
| Didecyl dimethyl ammonium chloride | 18% |

In certain embodiments, the fabric softener comprises about 0.5% to about 10% by weight of antibacterial agent. In preferred embodiments, the fabric softener comprises about 1% to about 6% by weight of antibacterial agent. In certain preferred embodiments, the fabric softener comprises about 2% to about 5% by weight of the composition.

In a particularly preferred embodiment, the composition comprises about 2% to about 3% by weight of water-soluble cationic antibacterial agents. In certain of those embodiments, the water-soluble cationic antibacterial agent comprises alkyl dimethyl benzylammonium chloride, octyl decyl dimethylammonium chloride, dioctyl dimethylammonium chloride, didecyl dimethylammonium chloride, or a mixture thereof.

Cationic Stabilizing Polymer

The cationic stabilizing polymer for use in the present invention are quaternary (meth)acrylic polymers. The polymers for use in the present invention may be homopolymers and/or co-polymers. If the quaternized polymers used herein are co-polymers, the polymer structure may be random or block, with randomly interspersed nonionic monomers or blocks of nonionic oligomers. “Quaternized” is the term given to a compound having a nitrogen atom with four (4) appendages and therefore a permanent positive charge. Consequently, there is a negatively charged counter-ion associated with each quaternized nitrogen atom in the cationic polymer. Synthesis of such quaternized (meth)acrylic polymers is found in the literature and includes, amongst other routes, both the polymerization of pre-quaternized monomers and the quaternization of polymers having appending tri-substituted amino groups with a reactant such as methyl chloride or benzyl chloride.

Suitable polymers are selected from those having the general structure (IX):

(IX)

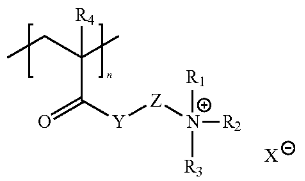

wherein; $R_4$ denotes H or $CH_3$; Y denotes O or NH; Z denotes: a linear alkyl chain of methylene units $(CH_2)$x, where x is an integer from 2 to 18; a substituted alkyl chain from 2 to 18 carbons in length having at least one hydroxyl group anywhere along the chain length; a benzene ring wherein the Y and the N substituents attach to the intervening benzene ring in a para relationship; or, a branched alkyl chain having a total number of carbons atoms from 2 to 18 carbon atoms; $R_1$, $R_2$, and $R_3$ are, independently, $—CH_3$, $—CH_2—C_6H_5$, $—C_2H_5$, $-n-C_{10}H_{21}$, -naphthalenyl, -benzofuranyl, or $—CH_2—C_6H_4—CH_2—O—C_6H_4—CHO$; X denotes an anion chosen from the group consisting of halides (Cl, Br, I), sulfates (½$SO_4$, $HSO_4$), methosulfate ($MeOSO_3$), trifluoromethane sulfonate (triflate, or "Tf"), tetrafluoroborate ($BF_4$), carbonates, bicarbonates, and mixtures thereof; and n (degree of polymerization) may be between several hundred to about 100 million.

As understood in the chemical arts, the term (meth)acrylic is meant to include all acrylate, acrylamide, methacrylate, and methacrylamide substances, which is why the general structure (V) above features variable Y and $R_4$ groups and defines them so as to incorporate each of the acrylate, acrylamide, methacrylate, and methacrylamide polymers.

A preferred quaternary (meth)acrylic polymer for use in the present fabric softener composition is Polyquaternium-37, N, N, N-Trimethyl-2-((2-methyl-1-oxo-2-propenyl)oxy) ethanaminium chloride homopolymer, CAS 26161-33-1.

Suitable copolymers may be made from one or more cationic monomers selected from the group consisting of N,N-dialkylaminoalkyl methacrylate, N,N-dialkylaminoalkyl acrylate, N,N-dialkylaminoalkyl acrylamide, N,N-dialkylaminoalkylmethacrylamide, quaternized N,N-dialkylaminoalkyl methacrylate, quaternized N,N-dialkylaminoalkyl acrylate, quaternized N,N-dialkylaminoalkyl acrylamide, quaternized N,N-dialkylaminoalkylmethacrylamide, vinylamine and its derivatives, allylamine and its derivatives, vinyl imidazole, quaternized vinyl imidazole and diallyl dialkyl ammonium chloride and combinations thereof, and optionally a second monomer selected from the group consisting of acrylamide, N,N-dialkyl acrylamide, methacrylamide, N,N-dialkylmethacrylamide, $C_1$-$C_{12}$ alkyl acrylate, $C_1$-$C_{12}$ hydroxyalkyl acrylate, polyalkylene glyol acrylate, $C_1$-$C_{12}$ alkyl methacrylate, $C_1$-$C_{12}$ hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole and derivatives, acrylic acid, methacrylic acid, maleic acid, vinyl sulfonic acid, styrene sulfonic acid, acrylamidopropylmethane sulfonic acid (AMPS) and their salts, and combinations thereof. The polymer may optionally be cross-linked. Suitable crosslinking monomers include ethylene glycoldiacrylate, divinylbenzene, butadiene.

Examples of suitable synthetic polymers are Polyquaternium-1, Polyquaternium-5, Polyquaternium-6, Polyquaternium-7, Polyquaternium-8, Polyquaternium-11, Polyquaternium-14, Polyquaternium-22, Polyquaternium-28, Polyquaternium-30, Polyquaternium-32, and Polyquaternium-33. Particularly preferred copolymers are Polyquaternium-33, Ethanaminium, N, N, N-trimethyl-2-((1-oxo-2-propenyl)oxy)-, chloride, polymer with 2-propenamide, and Polyquaternium -7, Acrylamide diallyldimethylammonium Chloride.

The cationic polymer is present from about 0.05% to about 5% by weight of the softener composition. In some embodiments, the cationic polymer is present from about 0.1% to about 3% by weight of the softener composition. In certain preferred embodiments, the cationic polymer is present from about 0.2% to about 1% by weight of the softener composition.

The use of amphoteric surfactants comprising ampholytes and betaines is possible, e.g., in amounts >0.01% by weight, based on the total fabric softener. Exemplary amphoteric surfactants include amine oxides and CAPB. The use of gemini surfactants is also possible, e.g., in amounts >0.01% by weight, based on the total fabric softener, provided they are cationic.

It is preferable if a laundry softener according to the invention is free from anionic surfactant, i.e., comprises 0% by weight of anionic surfactant, Wt. % based on the total fabric softener, as inclusion of typical anionic surfactants will create a stability issue resulting in a formula that is not stable and dispersed when stored at ambient conditions for 2 weeks or longer than 2 weeks.

The textile treatment compositions according to the invention may contain, in addition to the obligatory constituents (fabric softening component, antibacterial, and polymer) encapsulated fragrances as well as non-encapsulated fragrances), and further optional ingredients.

For example, microcapsules can be used which contain both fragrances and ingredients for the care of skin.

In addition to fragrances, the laundry softeners according to the invention may optionally contain further ingredients that improve the performance and/or aesthetic properties of the composition. Composition may additionally contain one or more substances from the group of nonaqueous solvents, pH adjusters, chelants, perfume carriers, dyes, hydrotropes, foam inhibitors, silicone oils, color transfer inhibitors, antioxidants, preservatives, corrosion inhibitors, antistatic agents, bittering agents, ironing aids, repellents, neutral filler salts and UV absorbers.

Non-aqueous solvents that can be used optionally in the fabric softeners include monohydric or polyhydric alcohols, alkanolamines or glycol ethers. Preferably, the solvents are selected from ethanol, n- or i-propanol, butanols, glycol, propane or butanediol, diglycol, propyl or butyldiglycol, hexylene glycol, ethylene glycol methyl ether, ethylene glycol ethyl ether, ethylene glycol propyl ether, ethylene glycol mono-n-butyl ether, diethylene glycol methyl ether, diethylene glycol ethyl ether, propylene glycol methyl, ethyl or propyl ether, dipropylene glycol monomethyl or ethyl ether, diisobutyl propylene glycol monomethyl or ethyl ether, methoxy, ethoxy or butoxy triglycol, 1-butoxyethoxy-2-propanol, 2-methyl-3-methoxybutanol, propylene glycol t-butyl ether and mixtures of these solvents. Non-aqueous solvents may be used in the laundry softeners in amounts of between 0.5% and 15% by weight, but preferably below 12% by weight and in particular below 9% by weight.

In order to bring the pH of the fabric softeners in the desired range, the use of pH adjusting agents, such as lactic acid, may be used. Usually, the amount of these adjusting agents does not exceed 7% by weight or preferably 5% by weight of the total formulation. A lower limit may e.g., be 0.1 wt. %. The pH of the compositions according to the invention is preferably about 2 to 4 to prevent hydrolysis of the ester quat.

The viscosity of the fabric softeners according to the invention can be measured using standard methods (e.g., Brookfield viscometer LVT-II at 20 spindle 3 U/min and 20° C.) to be measured and is preferably 20 to 4000 mPas wherein between 40 and 2000 mPas are particularly preferred. The viscosity of fabric softeners is particularly preferably in the range from 40 to 1000 mPas.

The preparation of the laundry softener according to the invention can be carried out according to techniques known to those skilled in the art for the production of liquid laundry softeners. This can be done for example by mixing the raw materials, optionally using high-shear mixing equipment. It is recommended to melt the cationic polymer and softening components and then to disperse the melt in with germicidal surfactant and a solvent, preferably water. The other ingredients including, e.g., the encapsulated perfume can be integrated into the fabric softener simply by adding to it.

Stability Index

Preferably, the softener compositions described herein are stable in that they are dispersed and have no visible phase separation.

Stability of the compositions can be assessed by separation analysis, e.g., using a Lumisizer 6103-29. In such cases, a separation index below 0.05 is preferred.

The stability of the compositions can also be assessed by a "Stability Index" or "Stability formula index," which uses the concentrations of water-insoluble quaternary ester or diester ammonium salt, water-soluble cationic antibacterial agent, and cationic polymer. It has been determined that the following equation can be utilized to determine a stability index for compositions comprising such ingredients, which can then, in turn, be used to prepare stable formulations.

Stability formula index=[(wt % of the water-insoluble quaternary ester or diester ammonium salt+3*(wt % of the cationic polymer)]/[wt % of the antibacterial agent].

Preferably, the stability formula index is 2.5 or greater than 2.5.

In one embodiment, a method for determining stability of a liquid fabric softener formulation involves providing a liquid fabric softener formulation that comprises (a) a water-insoluble quaternary ester or diester ammonium salt; (b) a water-soluble cationic antibacterial agent, and (c) a cationic polymer. The concentrations of components (a), (b), and (c) are used to calculate a stability formula index of the formulation according to the above equation:

The stability index of two different formulations can be compared to determine relative stability, wherein the greater the index, the more stable the formulation. Preferably, the stability formula index is 2.5 or greater than 2.5. Typically, reformulation will be suggested if the stability index is less than 2.5.

In another aspect, a method of preparing a stable liquid fabric softener formulation, can be undertaken based on the stability formula index. The method involves providing an effective amount of a water-insoluble quaternary ester or diester ammonium salt for desired softening effects and an effective amount of a water-soluble cationic antibacterial agent for desired antibacterial effects and picking a desirable stability formula index value, wherein the desirable stability formula index value is 2.5 or greater than 2.5. The amount of a cationic polymer needed to make a stable formulation is then determined according to the below equation and the stable fabric softener formulation containing the quaternary ester or diester ammonium salt, the water-soluble cationic antibacterial agent, and the cationic polymer in their respective amounts is prepared.

amount of the cationic polymer equals or is greater than: [(Stability formula index*the amount of the cationic antibacterial agent)−the amount of the quaternary ester or diester ammonium salt]/3

As used herein, the phrase "effective amount" refers to any amount capable of producing a softening or antibacterial effect on the treated substrate. A person of ordinary skill in the art would understand how to determine an effective amount for formulations disclosed herein.

The methods involving the stability index can use any of the agents described herein but preferably will utilize a water-soluble cationic antibacterial agent of formula (VIII):

(VIII)

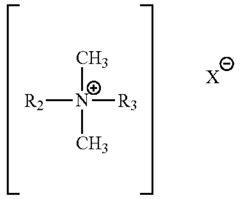

wherein $R_2$ and $R_3$ are the same or different $C_8$-$C_{12}$ alkyl, or $R_2$ is $C_{12-16}$ alkyl, $C_{8-18}$ alkylethoxy, $C_{8-18}$ alkylphenoxyethoxy, $R_3$ is benzyl, and X is a halide or is methosulfate; and a cationic polymer of formula (IX):

(IX)

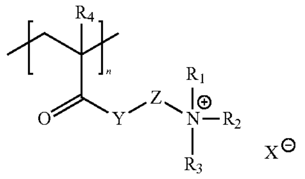

wherein $R^4$ is H or $CH_3$;

Y is O or NH;

Z is a linear alkyl chain of methylene units $(CH_2)x$, where x is an integer from 2 to 18, a substituted alkyl chain from 2 to 18 carbons in length having at least one hydroxyl group anywhere along the chain length, a benzene ring wherein the Y and the N substituents attach to the benzene ring in a para relationship, or a branched alkyl chain having a total number of carbons atoms from 2 to 18 carbon atoms;

$R^1$, $R^2$, and $R^3$ are, independently, $—CH_3$, $—CH_2—C_6H_5$, $—C_2H_5$, -n-$C_6H_{13}$, -n-$C_{10}H_{21}$, -naphthalenyl, -benzofuranyl, or $—CH_2—C_6H_4—CH_2—O—C_6H_4—CHO$;

X is an anion chosen from the group consisting of halides, sulfates, methosulfate, trifluoromethane sulfonate, tetrafluoroborate, carbonates, bicarbonates, and mixtures thereof, and n is between 200 to about 100 million, Preferable embodiments of compounds of formulas (VIII) and (IX) utilized with the stability formula index are discussed above with respect to the compositions or exemplified in the Examples.

Methods of Use

Another object of the invention is a textile treatment process in which the textile to be treated is subjected to a textile treatment using a fabric softener according to the invention (as described above), in particular in an automatic washing machine. Another object of the invention is the use of a fabric softener according to the invention (as described above) for conditioning textile fabrics imparting softening properties.

In addition to their softening properties, the laundry softener compositions according to the invention also have a germ-inhibiting effect in the last washing cycle of the washing machine due to their content of disinfectant quaternary ammonium compounds. By absorbing them on the textile material, they prevent the germs from multiplying there. This germ-inhibiting effect of the fabric softener according to the invention is particularly desirable since there is an increasing preference to use only cold or warm water for wash cycles to reduce energy expenses.

The compositions are added to the final rinse cycle of a textile laundry.

EXAMPLES

Example 1

Antibacterial Softener Compositions

Composition. A base softener composition was prepared according to TABLE 1. Three different rheology modifying polymers were utilized: A non-ionic HUER polymer mixture (17-18% polyurethane resin, 20.0-21.0% diethylene glycol monobutyl ether, and 61.0-63.0% water), a cationic polymer (Polyquaternium-37, CAS No. 26161-33-1, i.e., Ethanaminium, N,N,N-trimethyl-2-((2-methyl-1-oxo-2-propenyl)oxy)-chloride homopolymer), and an anionic acrylic copolymer mixture (30.0-32.0% acrylic polymer(s), <0.05% residual monomers, 68.0-70.0% water).

TABLE 1

| Ingredient | Base Wt % | Active Wt % in Formulas |
|---|---|---|
| Water | 83.57 | QS |
| Rheology Modifying Polymer | 1.00 | 0.01-1% |
| TEQ | 9.41 | 2~8% |
| Antibacterial Agent | 4.80 | 2~5% |
| Preservative | 0.05 | 0~0.002% |
| Dye | 0.18 | 0~0.01% |
| Fragrance | 0.99 | 0~1% |

Exemplary Method of Preparation

Water was heated to 30-35° C. and stabilizing polymer was added. The mixture was blended with an overhead mixer at 200-700 rpm until the polymer was fully incorporated. The blended mixture was heated to 65-70° C. and pre-heated (75° C.) cationic softening surfactant was added into the solution. When the solution became homogenous, the heater was turned off and the solution was cooled. When the temperature reached 40° C., germicidal surfactant that had been premixed 1:2 with water was added to the batch and the suspension was blended for 5-10 minutes at 200-700 rpm until homogenous. Fragrance, dye and other additional ingredients were added with stirring.

The composition having cationic stabilizer was clear and easy to disperse in cold water. The formula was stable at 25° C. after 2 weeks whereas separation was observed immediately during preparation of the composition having anionic polymer after the ester quat and antibacterial agent were added. Phase separation was observed in less than 7 days at 25° C. in the prepared composition containing nonionic polymer. The FIGURE is a photograph showing the appearance of phase separation in the nonionic formula containing 8% of the esterquat and 0.04% of the nonionic polymer after storage for 7 days. In comparison, as shown the FIGURE, the cationic formula containing 8% of the esterquat, 4% actives of the cationic polymer mixture, and 0.1% of the cationic polymer remained dispersed after 7 days at 25° C.

Example 2

Design of Experiment

Eight compositions were prepared having the formulas shown in TABLE 2. The ester quat was DEQ, and the antibacterial agent was an aqueous mixture with active surfactant blend of alkyl dimethyl benzyl ammonium chloride, octyl decyl dimethyl ammonium chloride, dioctyl dimethyl ammonium chloride, dodecyl dimethyl ammonium chloride. The solution used contained 40% by weight of an alkyl dimethyl benzylammonium chloride (50% C14, 40% C12, 10% C16 alkyl); 30% by weight of an octyl decyl dimethylammonium chloride; 12% by weight of dioctyl dimethylammonium chloride; and 18% by weight of didecyl dimethylammonium chloride.

Method of Preparation

Water was heated to 30-35° C. and cationic polymer was added. The mixture was blended with an overhead mixer at 200-700 rpm until the polymer was fully incorporated. The blended mixture was heated to 65-70° C. and pre-heated (75° C.) cationic softening surfactant was added into the solution. When the solution became homogenous, the heater was turned off and the solution was cooled. When the temperature reached 40° C., germicidal surfactant that had been premixed 1:2 with water was added to the batch and the suspension was blended for 5-10 minutes at 200-700 rpm until homogenous. Fragrance, dye and other additional ingredients were added with stirring.

Separation Analysis

A Lumisizer 6103-29 was used to conduct separation analysis of the eight compositions of Example 2. The separation index provided in Table 2 was determined after 2 hours of running at 2000 rpm rotation speed.

TABLE 2

| Formulation, active wt % | DOE 1 | DOE 2 | DOE 3 | DOE 4 | DOE 5 | DOE 6 | DOE 7 | DOE 8 |
|---|---|---|---|---|---|---|---|---|
| Softening Esterquat | 2 | 8 | 8 | 2 | 8 | 2 | 2 | 8 |
| Polyquaternium-37 | 1 | 1 | 0.2 | 0.2 | 1 | 0.2 | 1 | 0.2 |
| Antibacterial Quat | 2 | 2 | 2 | 2 | 5 | 5 | 5 | 5 |

TABLE 2-continued

| Formulation, active wt % | DOE 1 | DOE 2 | DOE 3 | DOE 4 | DOE 5 | DOE 6 | DOE 7 | DOE 8 |
|---|---|---|---|---|---|---|---|---|
| Water | q/s | q/s | q/s | q/s | q/s | q/s | q/s | q/s |
| Separation index | 0.005 | <0.001 | <0.001 | 0.816 | 0.518 | 0.847 | 0.06 | 0.586 |
| (Softening Ester-quat + 3 * Cationic Polymer: Antibacterial Quat | 2.5 | 5.5 | 4.3 | 1.3 | 2.2 | 0.5 | 1.0 | 1.7 |

Esterquat: DEQ
Polymer: Polyquaternium-37 cationic polymer
Antibacterial Quat: mixture of alkyl dimethyl benzylammonium chloride, octyl decyl dimethylammonium chloride, dioctyl dimethylammonium chloride, didecyl dimethylammonium chloride Stability Testing. The eight compositions were stored between 5° C. and 50° C. for 14 days. The formulas having a separation index below 0.05 were stable and showed no separation.

Analysis of the design of experiments found that the cationic polymer has about 3 times the efficacy compared to the esterquat softening surfactant to stabilize a product with cationic antimicrobial agent.

A preferred formulation range is one where the sum of the softening surfactant+3 times the amount of the cationic polymer is equal to or greater than 2.5 times the amount of the antimicrobial cationic surfactant.

Example 3

Stability Index

The results of separation index were fitted by a model, operated by software, and the summary of fit, analysis of variance, and parameter estimates were determined. The RSquare was 0.99. The parameter estimates are provided below in Table 3. The parameter estimate for the factor of cationic polymer is −0.21, and the parameter estimate for the factor of the Softening Ester-quat is −0.08; this indicates that the cationic polymer provided about 3 times the effect of response to reduce the separation index compared to that of Softening Ester-quat at the same amount. Further, it was determined that both Softening Esterquat and cationic polymer have a negative effect on the separation index, and the antibacterial actives have a positive effect on the separation index. Thus, increasing the amount of the Softening Esterquat or increasing the amount of cationic polymer reduces the separation index and makes the product more stable, however, increasing the amount of antibacterial actives increases the separation index and makes the product less stable.

TABLE 3

Parameter Estimates of 2 * 2 * 2 factorial DOE model

| Term | Estimate | Std Error | t Ratio | Prob > \|t\| |
|---|---|---|---|---|
| Intercept | 0.35425 | 0.009014 | 39.30 | 0.0006* |
| Softening Ester Quat | −0.07775 | 0.009014 | −8.63 | 0.0132* |
| Cationic Polymer | −0.20825 | 0.009014 | −23.10 | 0.0019* |
| Antibacterial Quat | 0.1485 | 0.009014 | 16.47 | 0.0037* |
| Softening Ester Quat * Cationic Polymer | 0.19125 | 0.009014 | 21.22 | 0.0022* |
| Softening Ester Quat * Antibacterial Quat | 0.127 | 0.009014 | 14.09 | 0.0050* |

To identify a suitable composition space for a good, long term stability, a stability formula index was calculated with the formula:

Stability formula index=[(Ester Quat active wt %)+3*(Cationic polymer active wt %)]/[Germicidal cationic surfactants active wt %]

It is preferred to have a stability formula index of equal to or greater than 2.5, in order to keep the composition stable. DoE compositions 1, 2, and 3 showed a stability formula index that is equal to or greater than 2.5. Those formulas also passed long term stability measure based on the separation index having an equal or lower than 0.05 value. However, DoE options 4, 5, 6, 7 and 8 having a stability formula index that is less than 2.5 do not exhibit long term stability based on separation index of greater than 0.05 value.

Example 4

Washing Test

A sample of inventive composition (2 fl oz) was tested for softening performance in traditional top loading washing machine (63 L cold water 14-20° C.). Softness (hand feel) was evaluated by a 10 person panel. The inventive composition showed better softening performance at a 59 ml dose compared to a standard commercial liquid fabric softener at its recommended dose for a small/median load.

Having now fully described this invention, it will be understood to, at a minimum, provide the following compositions:

1. A liquid fabric softener composition comprising a homogeneous dispersion of:
   a) from 0.5% to 20% by weight water-insoluble quaternary ester or diester ammonium salt;
   b) from 0.5% to 10% by weight of one or more water-soluble cationic antibacterial agents;
   c) from 0.05% to 5% by weight cationic acrylics polymer; and
   d) water.

2. The liquid fabric softener composition according to the preceding composition 1, wherein the liquid fabric softener does not contain a nonionic polymer or an anionic polymer.

3. The liquid fabric softener composition according to any of the preceding compositions 1 or 2, wherein the water-insoluble quaternary ester or diester ammonium salt is selected from a compound having formula (III), formula (IV), and mixtures thereof $$[(CH_3)_2N^+(CH_2CH_2OC(O)\text{—}R)_2]X^- \quad \text{(III)}$$

$$[(HOCH_2CH_2)(CH_3)N^+(CH_2CH_2OC(O)\text{—}R)_2]X^- \quad \text{(IV)}$$

wherein

R=linear saturated or unsaturated alkyl radical of 8 to 19 carbon atoms, and $X^-$ is a halide, methyl sulfate, ethyl sulfate, methyl phosphate, nitrate, acetate, or phosphate ion.

4. The liquid fabric softener composition according to any of the preceding compositions 1 to 3, wherein the water-insoluble quaternary ester or diester ammonium salt is selected from a compound of formula (II) and mixtures thereof (II)

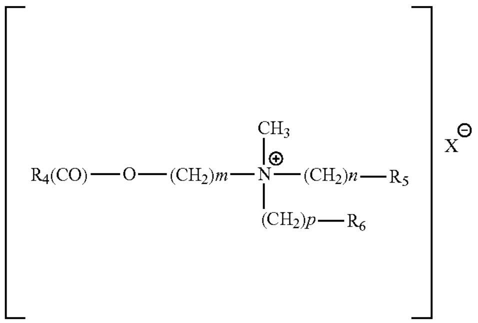

wherein $R_4$ is an aliphatic alkyl radical of 12 to 22 carbon atoms which has 0, 1, 2 or 3 double bonds;

$R_5$ is H, OH or O—(CO)$R_7$, $R_6$ is H, OH or O—(CO)$R_8$ independently of $R^5$, $R_7$ and $R_6$ each being independently an aliphatic alkyl radical of 12 to 22 carbon atoms which has 0, 1, 2 or 3 double bonds, m, n, and p are each independently 1, 2 or 3, and $X^-$ is a halide, methyl sulfate, ethyl sulfate, methyl phosphate, nitrate, acetate, or phosphate ion.

5. The liquid fabric softener composition according to the preceding composition 4, wherein $R_5$ is O—(CO)$R_7$, $R_4$ and $R_7$ are alkyl radicals having 16 to 18 carbon atoms, and $R_6$ is OH.

6. The liquid fabric softener composition according to any of the preceding compositions 1 to 5, wherein the water-soluble cationic antibacterial agent is selected from one or more quaternary ammonium salts.

7. The liquid fabric softener composition according to the preceding composition 6, wherein the quaternary ammonium salt is selected from a compound of formula (VII) and mixtures thereof (VII)

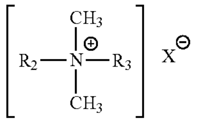

wherein $R_2$ and $R_3$ are the same or different $C_8$-$C_{12}$ alkyl, or $R_2$ is $C_{12-16}$ alkyl, $C_{8-18}$ alkylethoxy, $C_{8-18}$ alkylphenoxyethoxy and $R_3$ is benzyl, and $X^-$ is a halide or methosulfate.

8. The liquid fabric softener composition according to any of the preceding compositions 1 to 7, wherein the one or one or more water-soluble cationic antibacterial agents is a mixture of alkyl dimethyl benzylammonium chloride, octyl decyl dimethylammonium chloride, dioctyl dimethylammonium chloride, and didecyl dimethylammonium chloride.

9. The liquid fabric softener composition according to any of the preceding compositions 1 to 8, wherein the cationic acrylics polymer is a compound of formula (IX) or mixtures thereof (IX)

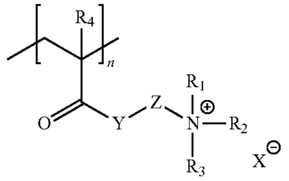

wherein $R_4$ is H or $CH_3$,

Y is O or NH;

Z is a linear alkyl chain of methylene units $(CH_2)_x$, where x is an integer from 2 to 18; a substituted alkyl chain from 2 to 18 carbons in length having at least one hydroxyl group anywhere along the chain length; a benzene ring wherein the Y and the N substituents attach to the intervening benzene ring in a para relationship; or a branched alkyl chain having a total number of carbons atoms from 2 to 18 carbon atoms;

$R_1$, $R_2$, and $R_3$ are, independently, —$CH_3$, —$CH_2$—$C_6H_5$, —$C_2H_5$, -n-$C_6H_{13}$, -n-$C_{10}H_{21}$, -naphthalenyl, -benzofuranyl, or —$CH_2$—$C_6H_4$—$CH_2$—O—$C_6H_4$—CHO;

X is an anion chosen from the group consisting of halides, sulfates, methosulfate, trifluoromethane sulfonate, tetrafluoroborate, carbonates, bicarbonates, and mixtures thereof; and n is between 200 to about 100 million.

10. The liquid fabric softener composition according to the preceding composition 9, wherein the compound of formula (IX) is N,N,N-Trimethyl-2-((2-methyl-1-oxo-2-propenyl)oxy)ethanaminium chloride homopolymer.

11. The liquid fabric softener composition according to the preceding composition 10, comprising about 0.1% to about 2% by weight N,N,N-Trimethyl-2-((2-methyl-1-oxo-2-propenyl)oxy)ethanaminium chloride homopolymer.

12. The liquid fabric softener composition according to any of the preceding compositions 1 to 11, wherein the water comprises greater than 50% by weight of the composition.

13. The liquid fabric softener composition according to any of the preceding compositions 1 to 12, wherein the composition is substantially free of an anionic polymer or detergent and a nonionic polymer or detergent.

14. A method for imparting antimicrobial properties to a fabric, comprising adding to the final rinse cycle of textile laundry any of compositions 1-13.

15. An antibacterial fabric softener composition comprising from 1% to 40% by weight ditallowethyl ester dimethyl ammonium chloride or di tallowethyl hydroxyethylmonium methosulfate;

one or more water-soluble cationic antibacterial agents;

from 0.05 to 5.0% by weight N,N,N-Trimethyl-2-((2-methyl-1-oxo-2-propenyl)oxy)ethanaminium chloride homopolymer; and water.

16. The fabric softener composition according to the preceding composition 15, comprising about 0.2% to about 1% by weight N,N,N-Trimethyl-2-((2-methyl-1-oxo-2-propenyl)oxy)ethanaminium chloride homopolymer.

17. The fabric softener composition according to any of the preceding compositions 15 or 16, comprising about 2% to about 8% by weight ditallowethyl ester dimethyl ammonium chloride.

18. The fabric softener composition according to any of the preceding compositions 15 to 17, comprising about 2% to about 3% by weight one or more water-soluble cationic antibacterial agents, the one or more water-soluble cationic antibacterial agents selected from the group consisting of alkyl dimethyl benzylammonium chloride, octyl decyl dimethylammonium chloride, dioctyl dimethylammonium chloride, didecyl dimethylammonium chloride, and mixtures thereof.

19. The fabric softener composition according to any of the preceding compositions 15 to 18, wherein a ratio of a sum of the amount of the ditallowethyl ester dimethyl ammonium chloride or the di tallowethyl hydroxyethylmonium methosulfate plus 3 times the amount of the water-soluble cationic antibacterial agents to the N,N,N-Trimethyl-2-((2-methyl-1-oxo-2-propenyl)oxy)ethanaminium chloride homopolymer is 2.5 or greater.

20. A liquid fabric softener composition comprising:

a) water-insoluble quaternary ester or diester ammonium salt;

b) water-soluble cationic antibacterial agent of formula (VIII):

(VIII)

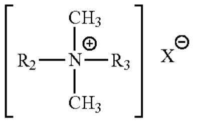

wherein $R_2$ and $R_3$ are the same or different $C_8$-$C_{12}$ alkyl, or $R_2$ is $C_{12-16}$ alkyl, $C_{8-18}$ alkylethoxy, $C_{8-18}$ alkylphenoxyethoxy and $R_3$ is benzyl, and X is a halide or is methosulfate; and c) a cationic polymer of formula (IX):

(IX)

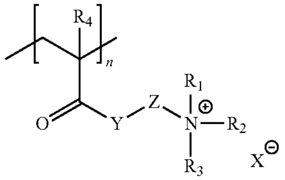

wherein $R_4$ is H or $CH_3$,

Y is O or NH;

Z is a linear alkyl chain of methylene units $(CH_2)x$, where x is an integer from 2 to 18, a substituted alkyl chain from 2 to 18 carbons in length having at least one hydroxyl group anywhere along the chain length, a benzene ring wherein the Y and the N substituents attach to the benzene ring in a para relationship, or a branched alkyl chain having a total number of carbons atoms from 2 to 18 carbon atoms;

$R_1$, $R_2$, and $R_3$ are, independently, $-CH_3$, $-CH_2-C_6H_5$, $-C_2H_5$, -n-$C_6H_{13}$, -n-$C_{10}H_{21}$, -naphthalenyl, -benzofuranyl, or $-CH_2-C_6H_4-CH_2-O-C_6H_4-CHO$;

X is an anion chosen from the group consisting of halides, sulfates, methosulfate, trifluoromethane sulfonate, tetrafluoroborate, carbonates, bicarbonates, and mixtures thereof, and n is between several hundred to about 100 million, wherein a sum of the amount of the water-insoluble quaternary ester or diester ammonium salt and 3 times the amount of the cationic polymer of formula (IX) is greater than or equal to 2.5 times the amount of the water-soluble cationic antibacterial agent of formula (VIII).

Moreover, the invention will be understood to provide the following uses:

Use of a composition according to any of the preceding compositions 1 to 20 for imparting antibacterial properties to a fabric;

Use of a composition according to any of the preceding compositions 1 to 20 for imparting softening and/or antibacterial properties to a fabric; and Use of a cationic acrylic polymer to stabilize a fabric softening composition containing a quaternary ester or diester ammonium salt and a cationic antibacterial agent.

All details given for the fabric softening composition regarding types and amounts of ingredients and all further descriptions of the invention are equally relevant and applicable for the use of the composition and the use of the cationic acrylic polymer described in the paragraph above.

Further, the invention will be understood to provide the following methods:

1. A method for determining stability of a liquid fabric softener formulation, comprising the steps of:

(i) providing the liquid fabric softener formulation that comprises:

(a) a water-insoluble quaternary ester or diester ammonium salt;

(b) a water-soluble cationic antibacterial agent of formula (VIII):

(VIII)

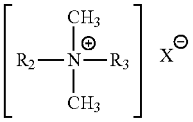

wherein $R_2$ and $R_3$ are the same or different $C_8$-$C_{12}$ alkyl, or $R_2$ is $C_{12-16}$ alkyl, $C_{8-18}$ alkylethoxy, $C_{8-18}$ alkylphenoxyethoxy, $R_3$ is benzyl, and X is a halide or is methosulfate; and (c) a cationic polymer of formula (IX):

(IX)

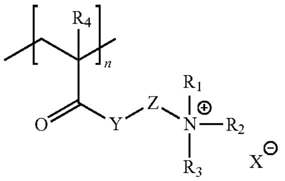

wherein $R^4$ is H or $CH_3$,

Y is O or NH;

Z is a linear alkyl chain of methylene units $(CH_2)x$, where x is an integer from 2 to 18, a substituted alkyl chain from 2 to 18 carbons in length having at least one hydroxyl group anywhere along the chain length, a benzene ring wherein the Y and the N substituents attach to the benzene ring in a para relationship, or a branched alkyl chain having a total number of carbons atoms from 2 to 18 carbon atoms;

$R^1$, $R^2$, and $R^3$ are, independently, $—CH_3$, $—CH_2—C_6H_5$, $—C_2H_5$, -n-$C_6H_{13}$, -n-$C_{10}H_{21}$, -naphthalenyl, -benzofuranyl, or $—CH_2—C_6H_4—CH_2—O—C_6H_4—CHO$;

X is an anion chosen from the group consisting of halides, sulfates, methosulfate, trifluoromethane sulfonate, tetrafluoroborate, carbonates, bicarbonates, and mixtures thereof, and n is between 200 to about 100 million, and (ii) calculating a stability index of the formulation according to the following equation:

Stability formula index=[(wt % of the (a) component+3*(wt % of the (c) component)]/[wt % of the (b) component].

2. The method for determining stability of a liquid fabric softener formulation according to the preceding method 1, further comprising a step of comparing the stability index of two different formulations determine relative stability, wherein the greater the index, the more stable the formulation.

3. The method for determining stability of a liquid fabric softener formulation according to any of the preceding methods 1 or 2, further comprising a step of suggesting reformulation if the stability index is less than 2.5.

4. The method for determining stability of a liquid fabric softener formulation according to any of the preceding methods 1 to 3, wherein (a) is selected from a compound of formula (II) and mixtures thereof (II)

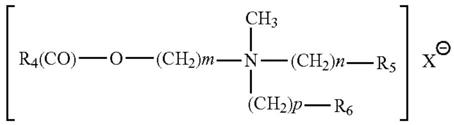

wherein $R_4$ is an aliphatic alkyl radical of 12 to 22 carbon atoms which has 0, 1, 2 or 3 double bonds;

$R_5$ is H, OH or O—(CO)$R_7$, $R_6$ is H, OH or O—(CO)$R_8$ independently of $R^5$, $R_7$ and $R_6$ each being independently an aliphatic alkyl radical of 12 to 22 carbon atoms which has 0, 1, 2 or 3 double bonds, m, n, and p are each independently 1, 2 or 3, and $X^-$ is a halide, methyl sulfate, ethyl sulfate, methyl phosphate, nitrate, acetate, or phosphate ion.

5. The method for determining stability of a liquid fabric softener formulation according to the preceding method 4, wherein $R_5$ is O—(CO)$R_7$, $R_4$ and $R_7$ are alkyl radicals having 16 to 18 carbon atoms, and $R_6$ is OH.

6. The method for determining stability of a liquid fabric softener formulation according to any of the preceding methods 1 to 5, wherein (a) is ditallowethyl ester dimethyl ammonium chloride or di tallowethyl hydroxyethylmonium methosulfate.

7. The method for determining stability of a liquid fabric softener formulation according to any of the preceding methods 1 to 3, wherein (a) is selected from a compound having formula (III), formula (IV), and mixtures thereof $$[(CH_3)_2N^+(CH_2CH_2OC(O)—R)_2]X^- \quad (III)$$

$$[(HOCH_2CH_2)(CH_3)N^+(CH_2CH_2OC(O)—R)_2]X^- \quad (IV)$$

wherein

R=linear saturated or unsaturated alkyl radical of 8 to 19 carbon atoms, and $X^-$ is a halide, methyl sulfate, ethyl sulfate, methyl phosphate, nitrate, acetate, or phosphate ion.

8. The method for determining stability of a liquid fabric softener formulation according to any of the preceding methods 1 to 7, wherein (b) is a mixture of alkyl dimethyl benzylammonium chloride, octyl decyl dimethylammonium chloride, dioctyl dimethylammonium chloride, and didecyl dimethylammonium chloride.

9. The method for determining stability of a liquid fabric softener formulation according to any of the preceding methods 1 to 8, wherein the compound of formula (IX) is N,N,N-Trimethyl-2-((2-methyl-1-oxo propenyl)oxy) ethanaminium chloride homopolymer.

10. A method of preparing a stable liquid fabric softener formulation, comprising the steps of:

(i) providing an effective amount of a water-insoluble quaternary ester or diester ammonium salt for desired softening effects and an effective amount of a water-soluble cationic antibacterial agent of formula (VIII) for desired antibacterial effects:

(VIII)

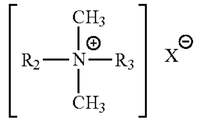

wherein $R_2$ and $R_3$ are the same or different $C_8$-$C_{12}$ alkyl, or $R_2$ is $C_{12-16}$ alkyl, $C_{8-18}$ alkylethoxy, $C_{8-18}$ alkylphenoxyethoxy and $R_3$ is benzyl, and X is a halide or is methosulfate;

(ii) picking a desirable stability formula index value, wherein the desirable stability formula index value is 2.5 or greater than 2.5;

(iii) determining an amount of a cationic polymer of formula (IX) needed to make a stable formulation according to following equation:

amount of the cationic polymer equals or is greater than: [(Stability formula index*the amount of the cationic antibacterial agent of formula (VIII))−the amount of the quaternary ester or diester ammonium salt]/3 wherein the cationic polymer of formula (IX) is:

(IX)

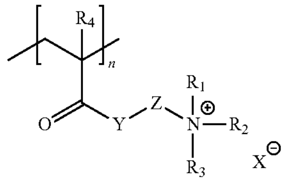

wherein $R^4$ is H or $CH_3$,

Y is O or NH;

Z is a linear alkyl chain of methylene units $(CH_2)x$, where x is an integer from 2 to 18, a substituted alkyl chain from 2 to 18 carbons in length having at least one hydroxyl group anywhere along the chain length, a benzene ring wherein the Y and the N substituents attach to the benzene ring in a para relationship, or a branched alkyl chain having a total number of carbons atoms from 2 to 18 carbon atoms;

$R^1$, $R^2$, and $R^3$ are, independently, $—CH_3$, $—CH_2—C_6H_5$, $—C_2H_5$, -n-$C_6H_{13}$, -n-$C_{10}H_{21}$, -naphthalenyl, -benzofuranyl, or $—CH_2—C_6H_4—CH_2—O—C_6H_4—CHO$;

X is an anion chosen from the group consisting of halides, sulfates, methosulfate, trifluoromethane sulfonate, tetrafluoroborate, carbonates, bicarbonates, and mixtures thereof, and n is between several hundred to about 100 million; and (iv) preparing the stable fabric softener formulation containing the quaternary ester or diester ammonium salt, the water-soluble cationic antibacterial agent of formula (VIII), and the cationic polymer in their respective amounts.

11. The method of preparing a stable liquid fabric softener formulation according to the preceding method 10, further comprising a step of adjusting components of the fabric softener formulation to adjust its stability formula index.

12. The method of preparing a stable liquid fabric softener formulation according to any of the preceding methods 10 or 11, wherein the water-insoluble quaternary ester or diester ammonium salt is selected from a compound of formula (II) and mixtures thereof (II)

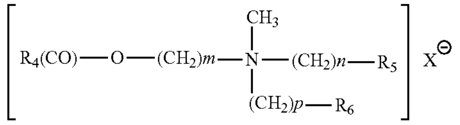

wherein $R_4$ is an aliphatic alkyl radical of 12 to 22 carbon atoms which has 0, 1, 2 or 3 double bonds;

$R_5$ is H, OH or $O—(CO)R_7$, $R_6$ is H, OH or $O—(CO)R_8$ independently of $R^5$, $R_7$ and $R_6$ each being independently an aliphatic alkyl radical of 12 to 22 carbon atoms which has 0, 1, 2 or 3 double bonds, m, n, and p are each independently 1, 2 or 3, and $X^-$ is a halide, methyl sulfate, ethyl sulfate, methyl phosphate, nitrate, acetate, or phosphate ion.

13. The method of preparing a stable liquid fabric softener formulation according to any of the preceding method 12, wherein $R_5$ is $O—(CO)R_7$, $R_4$ and $R_7$ are alkyl radicals having 16 to 18 carbon atoms, and $R_6$ is OH.

14. The method of preparing a stable liquid fabric softener formulation according to any of the preceding methods 10 to 13, wherein the water-insoluble quaternary ester or diester ammonium salt is ditallowethyl ester dimethyl ammonium chloride or di tallowethyl hydroxyethylmonium methosulfate, or a combination thereof.

15. The method of preparing a stable liquid fabric softener formulation according to any of the preceding methods 10 or 11, wherein the water-insoluble quaternary ester or diester ammonium salt is selected from a compound having formula (III), formula (IV), and mixtures thereof $$[(CH_3)_2N^+(CH_2CH_2OC(O)—R)_2]X^- \quad (III)$$

$$[(HOCH_2CH_2)(CH_3)N^+(CH_2CH_2OC(O)—R)_2]X^- \quad (IV)$$

wherein

R=linear saturated or unsaturated alkyl radical of 8 to 19 carbon atoms, and $X^-$ is a halide, methyl sulfate, ethyl sulfate, methyl phosphate, nitrate, acetate, or phosphate ion.

16. The method of preparing a stable liquid fabric softener formulation according to any of the preceding methods 10 to 15, wherein the water-soluble cationic antibacterial agent of formula (VIII) is a mixture of alkyl dimethyl benzylammonium chloride, octyl decyl dimethylammonium chloride, dioctyl dimethylammonium chloride, and didecyl dimethylammonium chloride.

17. The method of preparing a stable liquid fabric softener formulation according to any of the preceding methods 10 to 16, wherein the compound of formula (IX) is N,N,N-Trimethyl-2-((2-methyl-1-oxo-2-propenyl)oxy) ethanaminium chloride homopolymer.

18. A method of imparting antibacterial and/or softening properties to a fabric comprising adding to the final rinse cycle of textile laundry a composition comprising a homogeneous dispersion of:

a) from 0.5% to 20% by weight water-insoluble quaternary ester or diester ammonium salt;

b) from 0.5% to 10% by weight of one or more water-soluble cationic antibacterial agents;

c) from 0.05% to 5% by weight cationic acrylics polymer; and d) water.

19. A method for enhancing stability of a fabric softening composition by adding to the composition a quaternary ester or diester ammonium salt, a cationic antibacterial agent, and a cationic acrylic polymer.

All details given for the fabric softening composition regarding types and amounts of ingredients and all further descriptions of the invention are equally relevant and applicable for the method for enhancing stability, and the use of the cationic acrylic polymer described in the paragraph above.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor, and thus, are not intended to limit the present invention and the appended claims in any way.

The breadth and scope of the present invention should not be limited by any of the above-described exemplary embodiments, but should be defined only in accordance with the following claims and their equivalents.

What is claimed is:

1. A liquid fabric softener composition consisting essentially of:

a) from 1-10% by weight water-insoluble quaternary ester or diester ammonium salt;

b) from 1-10% by weight of one or more water-soluble cationic antibacterial agents selected from the group consisting of alkyl dimethyl benzylammonium chloride, octyl decyl dimethylammonium chloride, dioctyl dimethylammonium chloride, and didecyl dimethylammonium chloride;

c) from 0.05% to 5% by weight cationic acrylics polymer; and d) water: wherein the cationic acrylics polymer is a compound of formula (IX) or mixtures thereof (IX)

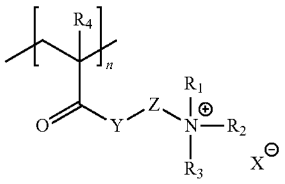

wherein $R_4$ is H or $CH_3$;

Y is O or NH;

Z is a linear alkyl chain of methylene units $(CH_2)x$, where x is an integer from 2 to 18; a substituted alkyl chain from 2 to 18 carbons in length having at least one hydroxyl group anywhere along the chain length; a benzene ring wherein the Y and the N substituents attach to the intervening benzene ring in a para relationship; or a branched alkyl chain having a total number of carbons atoms from 2 to 18 carbon atoms;

$R_1$, $R_2$, and $R_3$ are, independently, $—CH_3$, $—CH_2—C_6H_5$, $—C_2H_5$, -n-$C_6H_{13}$, -n-$C_{10}H_{21}$, -naphthalenyl, -benzofuranyl, or $—CH_2—C_6H_4—CH_2—O—C_6H_4—CHO$;

X is an anion selected from the group consisting of halides, sulfates, methosulfate, trifluoromethane sulfonate, tetrafluoroborate, carbonates, bicarbonates, and mixtures thereof;

n is between 200 to about 100 million; and wherein the mixture is a liquid of homogeneous dispersion with a stability formula index of at least 2.5, defined by the formula (a+3c)/b.

2. The liquid fabric softener composition of claim 1, wherein the liquid fabric softener does not contain a nonionic polymer or an anionic polymer.

3. The liquid fabric softener composition of claim 1, wherein the water-insoluble quaternary ester or diester ammonium salt is selected from a compound having formula (III), formula (IV), and mixtures thereof $$[(CH_3)_2N^+(CH_2CH_2OC(O)—R)_2]X^- \quad (III)$$

$$[(HOCH_2CH_2)(CH_3)N^+(CH_2CH_2OC(O)—R)_2]X^- \quad (IV)$$

wherein

R=linear saturated or unsaturated alkyl radical of 8 to 19 carbon atoms, and $X^-$ is a halide, methyl sulfate, ethyl sulfate, methyl phosphate, nitrate, acetate, or phosphate ion.

4. The liquid fabric softener composition of claim 1, wherein the water-insoluble quaternary ester or diester ammonium salt is selected from a compound of formula (II) and mixtures thereof (II)

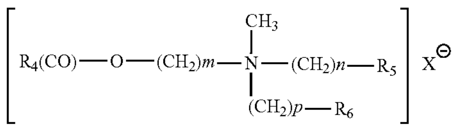

wherein $R_4$ is an aliphatic alkyl radical of 12 to 22 carbon atoms which has 0, 1, 2 or 3 double bonds;

$R_5$ is H, OH or O—(CO)$R_7$, $R_6$ is H, OH or O—(CO)$R_8$ independently of $R^5$, $R_7$ and $R_8$ each being independently an aliphatic alkyl radical of 12 to 22 carbon atoms which has 0, 1, 2 or 3 double bonds, m, n, and p are each independently 1, 2 or 3, and $X^-$ is a halide, methyl sulfate, ethyl sulfate, methyl phosphate, nitrate, acetate, or phosphate ion.

5. The liquid fabric softener composition of claim 4, wherein

R5 is O—(CO)$R_7$, $R_4$ and $R_7$ are alkyl radicals having 16 to 18 carbon atoms, and $R_6$ is OH.

6. The liquid fabric softener composition of claim 1, wherein the compound of formula (IX) is N,N,N-Trimethyl-2-((2-methyl-1-oxo-2-propenyl)oxy)ethanaminium chloride homopolymer.

7. The liquid fabric softener composition of claim 6, comprising about 0.1% to about 2% by weight N,N,N-Trimethyl-2-((2-methyl-1-oxo-2-propenyl)oxy) ethanaminium chloride homopolymer.

8. The liquid fabric softener composition of claim 1, wherein the water comprises greater than 50% by weight of the composition.

9. The liquid fabric softener composition of claim 1, wherein the composition is substantially free of an anionic polymer and a nonionic polymer.

10. A method for imparting antimicrobial properties to a fabric, comprising adding to the final rinse cycle of textile laundry a composition according to claim 1.

11. An antibacterial fabric softener composition comprising:

a) from 1% to 40% by weight ditallowethyl ester dimethyl ammonium chloride or di tallowethyl hydroxyethylmonium methosulfate;

b) from 1 to 10% by weight of one or more water-soluble cationic antibacterial agents selected from the group consisting of alkyl dimethyl benzylammonium chloride, octyl decyl dimethylammonium chloride, dioctyl dimethylammonium chloride, and didecyl dimethylammonium chloride;

c) from 0.05 to 5.0% by weight N,N,N-Trimethyl-2-((2-methyl-1-oxo-2-propenyl)oxy)ethanaminium chloride homopolymer; and d) water; wherein the fabric softener composition is a liquid of homogenous dispersion with a stability formula index of at least 2.5, defined by the formula (a+3c)/b.

12. The fabric softener composition of claim 11, comprising about 0.2% to about 1% by weight N,N,N-Trimethyl-2-((2-methyl-1-oxo-2-propenyl)oxy) ethanaminium chloride homopolymer.

13. The fabric softener composition of claim 11, comprising about 2% to about 8% by weight ditallowethyl ester dimethyl ammonium chloride.

14. The fabric softener composition of claim 11, comprising about 2% to about 3% by weight one or more water-soluble cationic antibacterial agents.

* * * * *